United States Patent [19]
König et al.

[11] Patent Number: 4,946,108
[45] Date of Patent: Aug. 7, 1990

[54] APPARATUS FOR PRODUCING COMPOST

[75] Inventors: Norbert König, Augsburg; Peter Kasberger, Aystetten, both of Fed. Rep. of Germany

[73] Assignee: Lescha Maschinenfabrik GmbH & Co. KG, Augsburg, Fed. Rep. of Germany

[21] Appl. No.: 381,100

[22] Filed: Jul. 17, 1989

[30] Foreign Application Priority Data

Aug. 11, 1988 [DE] Fed. Rep. of Germany ....... 3827282

[51] Int. Cl.$^5$ .............................................. B02C 23/12
[52] U.S. Cl. .......................................... 241/78; 241/80; 241/81; 241/91; 241/152 A; 241/260.1
[58] Field of Search ................. 51/164.1; 34/108, 110, 34/112; 366/54, 62, 236, 220; 432/103; 266/173; 165/89; 241/80, 97, 24, 74, 91, 81, 299, 180, 176, 177, 178, 260.1, 152 A, 78, 79

[56] References Cited

U.S. PATENT DOCUMENTS

| | | | |
|---|---|---|---|
| 1,516,913 | 11/1924 | Cramm | 241/180 X |
| 2,100,599 | 11/1937 | Schulthess et al. | 241/179 X |
| 2,316,032 | 4/1943 | Wallace | 241/178 X |
| 2,480,085 | 8/1949 | Mitchell | 241/74 |

FOREIGN PATENT DOCUMENTS 6860  8/1904  Denmark ............................. 241/80

Primary Examiner—Mark Rosenbaum
Attorney, Agent, or Firm—Edwin D. Schindler

[57]  ABSTRACT

In the case of a composter comprising a drum supported for rotation about a level longitudinal axis thereof, means for driving said drum about said axis, said drum including a peripheral casing which is at least partly in the form of perforated sheet metal panels, a longitudinal conveying device fitted under said drum and able to be driven selectively in opposite directions for selective conveying of compost falling from said drum to a compost deposit and a lifting conveying device arranged at one end of said drum, a charging device arranged in an upper part of the drum for cooperation with the lifting conveyor, the aim of the invention is to ensure the most even distribution of the coarse material along the length of the drum while nevertheless keeping to a simple design of the composter and ease of operation. For this purpose the said drum driving means is adapted to turn said drum in either direction about said axis, and at least one internal door is hinged on said casing for closing and opening a door opening in said casing, said door being arranged to pivot about a hinge axis parallel to the drum axis.

22 Claims, 3 Drawing Sheets

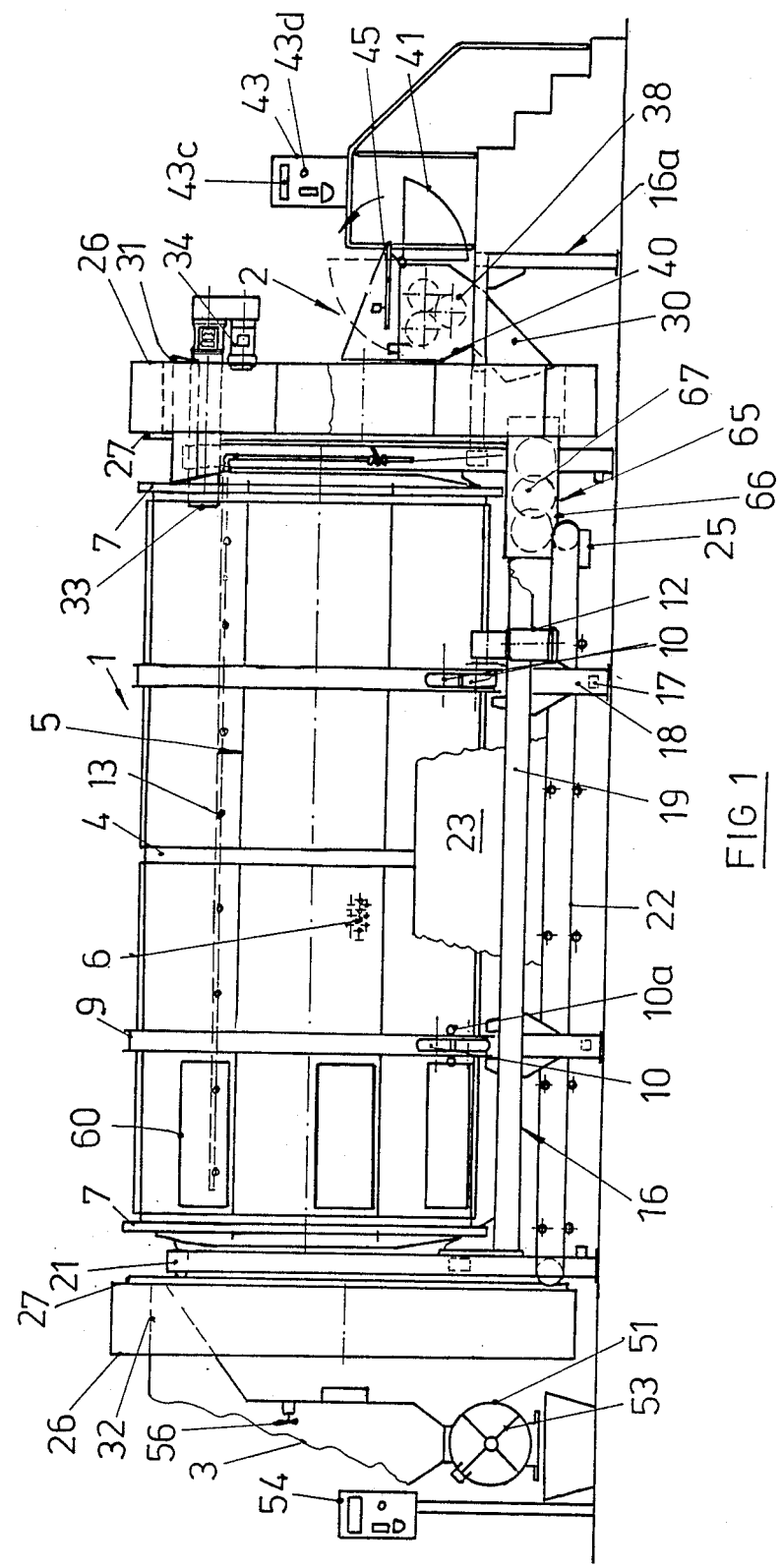

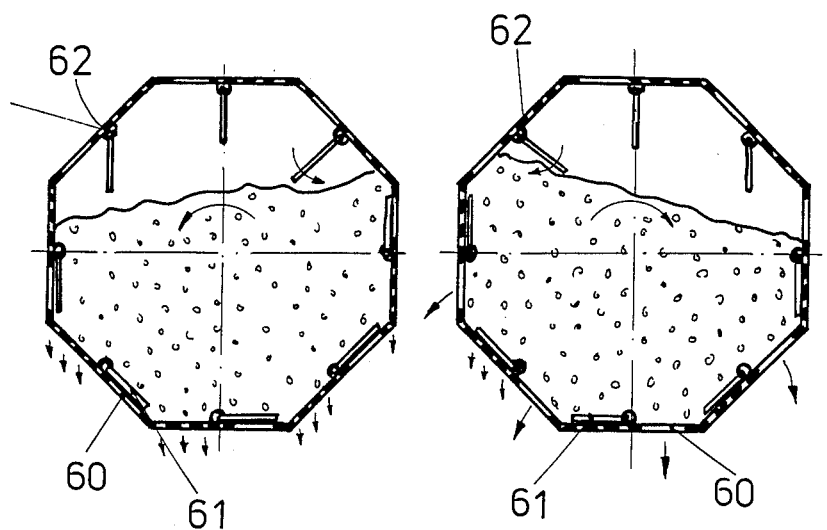
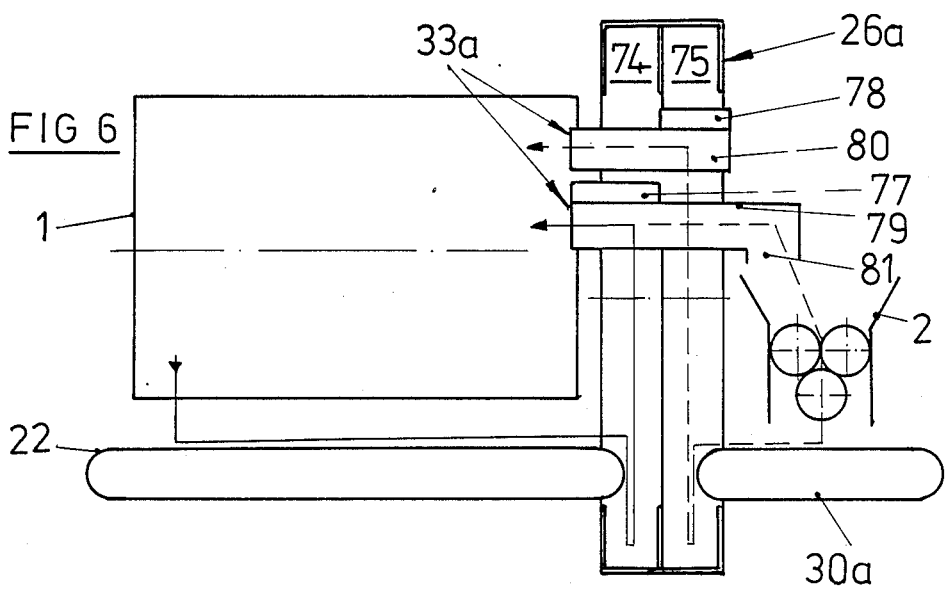
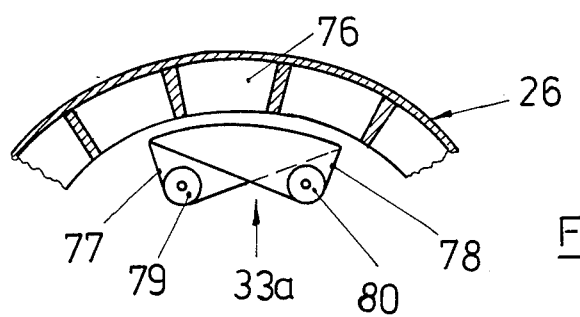

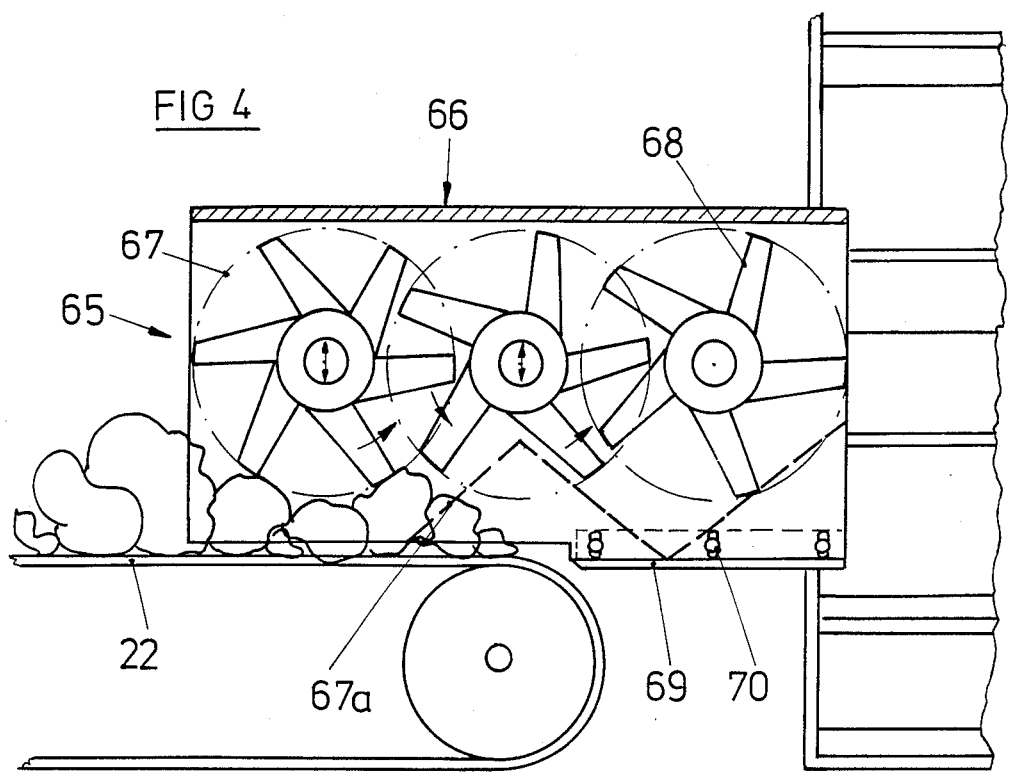
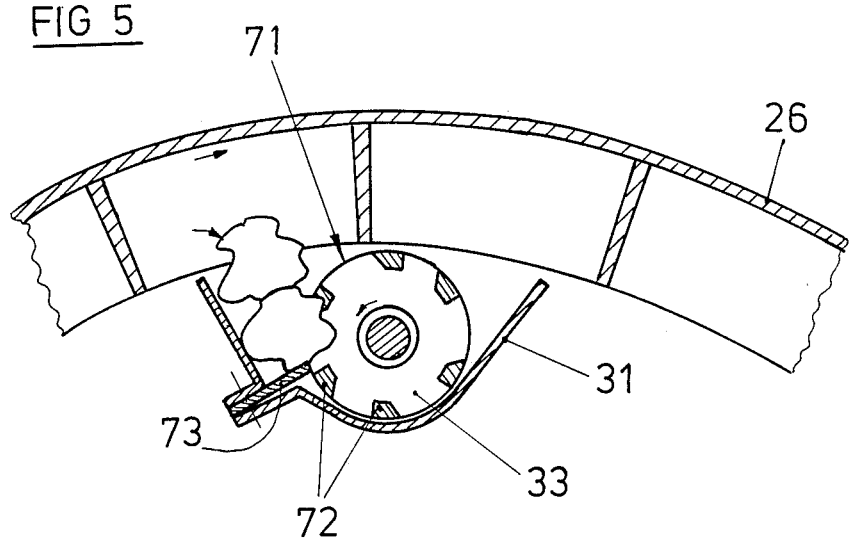

APPARATUS FOR PRODUCING COMPOST

BACKGROUND OF THE INVENTION

The invention relates to an apparatus for producing compost, more particularly from domestic and/or garden refuse or the like, comprising a drum adapted to be driven for rotation about its generally level longitudinal axis and having a circumferential casing which is at least in part formed by perforated sheet metal, a longitudinal conveying device arranged generally parallel to the axis and able to be driven forwards and backwards under the drum for the purpose of conveying material falling out of the drum either to a compost pile or to a lifting conveyor arranged adjacent one end of the drum, and a charging device arranged in the upper part of the drum for cooperation with a lifting conveying device.

The content of the drum is as a rule not homogeneous and will tend to contain fine and coarse particles. The coarse material is in this respect less easy to rot down than the fine material and there is thus the requirement for causing a distribution of the fine and coarse material which is as even as possible. On the other hand the rotating drum tends to cause a division of the material into coarse and fine fractions. It is assumed that the so-called Coriolis acceleration is the cause of this, which leads to zones with a pronounced concentration of the coarse material. The conveying device which is able to be driven forwards and backwards does, it is true, makes possible a return of the material falling out of the drum in cooperation with the lifting conveying device. However, the perforated sheet metal forming the peripheral casing of the drum only sifts out fine material and coarse material is retained in the drum so that in the coarse of time there is a pronounced collection of coarse material in the drum to be expected, more especially since this material, as already noted, is difficult to rot down. The result is that the rate of processing of the material through the apparatus is considerably reduced. In the case of the coarse material it generally turns out to be adhering lumps of rotting material. These lumps are very difficult to rot down owing to their consistency and may thus greatly impair the rotting process, more especially if there is a high local concentration of such lumps.

SHORT SUMMARY OF THE INVENTION

Taking this state of the art as a starting point one object of the present invention is thus to so improve upon an apparatus of the initially mentioned type using simple and low-price means that there is the greatest possible evenness of distribution of coarse and fine material.

A further object of the invention is to make this possible in such a manner that the apparatus has a simple design and is easy to operate.

In order to achieve these and/or other objects appearing from the present specification, claims and drawings, the casing of the drum, which is able to be rotated both forwards and backwards, is provided with at least one door opening and an internal door therefor with a hinge axis parallel to the axis of the drum.

These features offer the possibility of removing coarse material from the drum which is retained by the peripheral perforated sheet metal. It is thus possible to break up adhering lumps in the drum and to return the lumps to the drum making use of the useful feature of being able to put material back into the drum, the said lumps being surrounded and mixed with active, more readily rotted material. The lumps automatically fall out of the drum by way of the doorway provided in accordance with the invention. In order to break up the adhering lumps formed as a result of the Coriolis acceleration, the doorway, of which there is at least one, only has to be placed at the position where the lumps turn out to be most likely to occur. The invention thus takes advantage of the fractionating effect, which as such is undesired. At the same time the features of the invention ensure a rapid emptying of the drum. There is the further advantage that the doorway or the doorways are opened or closed by the door owing to the effect of gravity so that operation of the doors is possible by reversing the direction of rotation of the drum.

The greater collection or concentration of the lumps normally takes place adjacent to the drum end which is to the fore in terms of the direction of charging. It is thus convenient if the doorway or doorways are arranged in this part of the drum.

In accordance with a further particularly preferred form of the invention there is at least one comminuting device placed so as to receive material falling directly or indirectly out of the drum and to be charged by the longitudinal conveying device fitting under the drum. This feature leads to the useful effect that there is a mechanical additional comminution of the coarse material taken from the drum, such as lumps and the like, this increasing the speed of rotting and thus the rate at which the material is processed by the apparatus. In this respect it is possible to provide an additional comminuting device adjacent to the longitudinal conveying device and/or the charging device. A further possibility resides in that the material dropping out of the drum may be supplied to the input comminuting device, which is in any case present and with which the fresh material to be put in the drum is comminuted.

Further advantageous features of the invention will be seen from the ensuing account of some working embodiments to be seen in the drawings, and from the claims.

LIST OF THE SEVERAL VIEWS OF THE DRAWING

FIG. 1 is a side view of a composting apparatus in accordance with the invention.

FIG. 2 is cross section taken through the drum of the said composter with the doors open.

FIG. 3 is a cross section taken through the drum of the said composter with the doors closed FIG. 4 is an enlarged side view of a comminuting device integrated in the longitudinal conveying device.

FIG. 5 is a view on a larger scale of a comminuting device integrated in the charging device.

FIG. 6 is a diagrammatic view of the composter with the input comminuting device able to be charged with drum material.

FIG. 7 is a view of part of the arrangement to be seen in FIG. 6.

DETAILED DESCRIPTION OF THE EMBODIMENTS OF THE INVENTION

The composter represented in FIG. 1 includes a drum 1 which forms a rotting device and is supported so that it may be turned in either direction about its longitudinal axis a. It forms a rotting container and is fed with starting material by an input comminuting device 2, arranged on the right in the figure at the end of the drum. The input device 2 serves to chop up the material. At the end of the drum 1 to be seen on the left in the figure there is a silo 3 for the finished compost. The outer peripheral casing of the drum 1 is made up of a support framework formed by longitudinal and transverse beams 4 to carry perforated panels of sheet metal 5 in the openings of the framework. In the present case the drum 1 possesses, as may best be seen from FIGS. 2 and 3, an octagonal cross section. The perforated panels of sheet metal 5 may be flat and flanged at their edges as cut by the cross section so that they abut each other. The fact that the drum is polygonal enhances the mixing effect and simplifies manufacture. The drum end walls 7 are stationary in the present case.

The peripheral drum casing is encircled by two circular race rings 9 of u-like cross section, which are mounted on oppositely placed rollers 10. The distance apart of the oppositely placed rollers 10 is somewhat smaller than the maximum drum diameter so that the race rings 9 have their lower peripheral part resting on the rollers 10. The rollers 10 are carried on a frame fitted under the drum 1 and include longitudinal beams 19 placed on stays 18 connected with each other by crosspieces 17. This structure carries holders for the rollers 10. At the ends of the longitudinal beams 19 portal-like frames 21 are fixed to receive the stationary drum walls 7.

At least one of the rollers 10 is connected with a drive motor 12 in a rotation transmitting manner. The motor may be put into operation in order to drive the drum 1. The motor 12 responds to means sensing rotting conditions such as temperature and moisture content and means sensing the operating parameters such as the degree of filling of the silo etc. The rotting conditions and operating parameters are sensed with suitable sensors placed within the drum 1 and, respectively, the silo 3. The sensors are connected with the input of a controller, which converts such input signals into suitable control signals. When processing very dry starting material additional moistening of the drum contents may be called for. For this purpose the illustrated form of the invention will be seen to have a water pipe leadinng through one stationary end wall to nozzles for spraying into the interior of the drum.

The perforations 6 in the perforated panels of sheet metal 5 serve to ventilate the drum 1 and for discharging the finished compost with a sifting action. In a simple case the diameter of the holes 6 in the perforated sheet metal may be the same along the full length of the drum. In many cases it has been found to be an advantage if the diameter of the holes increases in the direction of charging the drum 1, that is to say in the present case from the right towards the left. This will then take into account the fact that the material to be composted inclines to form lumps.

In order to remove coarse material (from the drum 1) as for instance dense lumps of compost material formed by the conglomeration of compost material, in the part of its length delimited by two beams 4 extending in the peripheral direction, the drum casing is provided with a plurality of peripheral door openings 60. In the illustrated working example of the invention in each flat peripheral zone of the polygonally prismatic drum there is one doorway 60, as may be best seen from FIGS. 2 and 3. The doorways 60 are, as will be also seen from these figures, able to be closed by respective doors 61 on the inside. The doors 61 are hinged at an edge parallel to the axis of the drum. The hinge bearings needed for this are mounted on the inner side of the drum casing adjacent to the associated edge parallel to the drum axis at the side of the respective doorway.

In order to ensure a tumbling of the filling of the drum the upper drum part is in part left empty. The doors 61 which are only hinged along one edge thus hang down approximately vertically owing to gravity as they pass through the uppermost part of the drum, as will also be seen from FIGS. 2 and 3. If the drum 1 is now so turned that the hinge axis 62 of the doors 61 is trailing in the direction of rotation, as shown in FIG. 2, the doors 61 will be applied, by the drum contents slipping down into the downwardly moving drum half, to the edge of the respective doorway 60 which is leading in the direction of rotation so that the doorway 60 is shut. When the drum so turns that the hinge axis 62 of the doors 61 is ahead of the latter in the direction of rotation, as is shown in FIG. 3, the doors 61 are swung out of position by the material sliding into the downwardly moving drum half, away from the respectively associated doorway 60 so that the latter is opened. In this case the coarse material in the form of lumps etc is able to fall out of the drum. The question as to whether coarse material is to be removed or only fine material is to be sifted out, accordingly exclusively depends on the direction of rotation of the drum 1. The drum drive motor is thus reversible.

The doorways 60 and their doors 61 are so designed and arranged that there is in any case a firm engagement of the doors 61 either on the doorway edge (FIG. 2) or on the leading casing part (FIG. 3). For this purpose the hinge axis 52 of a door 61 is generally at the middle of the cross section edges of the polygonal drum cross section. The extent of the doorways 60 in the peripheral direction is somewhat smaller than half the cross section edge length so that the doors 61 in the folded back state do not move past the leading cross section edge, thus preventing bending loads on the doors 61. The doors 61 may thus be made in the form of simple sheet metal members. It would also be possible for the sheet metal parts forming the doors 61 to be perforated so that in the shut position of the doors 61 there would be a sifting of fine material by the doors and the release of such material from the drum and also a ventilation of the drum.

The charging of the drum 1 is at the right end as will be seen in FIG. 1. Owing to the Coriolis acceleration present in the rotating system coarser parts are moved more quickly to the left end of the drum which is to front in terms of the direction of charging, than the fine fractions. This applies more especially also for the lumps consisting of composting material. The material composting or rotting in the drum in fact tends to stick together as small lumps, which are not able to fall through the holes 6 in the perforated sheet metal 5. The row of doors moving round in the direction of rotation with one respective doorway 60 in each peripheral panel is accordingly in the illustrated working example of the invention adjacent to the longitudinal section of the drum adjacent to the left drum end. Owing to the breaking up here of adhering lumps and the return of this material into the drum 1 at the right hand drum end there is an evening out of the composting action along the length of the drum.

In order to remove the material dropping out of the drum there is a longitudinal conveying device in the form of a belt conveyor 22 under the drum. The frame of the belt conveyor 22 is supported on the crosspieces 17. This belt conveyor 22 is located at the lowest point of a duct which is fitted around the lower peripheral part of the drum 1 and is formed by sheet metal plates 23 arranged in the form of a funnel and mounted on the frame 16. The plates 23 project to such an extent that all material dropping through the holes 6 and the doorways 60 from the drum 1 is caught.

The belt conveyor 22 is able to be driven by means of a motor 25, which is able to be automatically started with the motor 12 for driving the drum 1. The drive device of the belt conveyor 22 is able to be reversed in such a manner that the material which has fallen out of the drum 1 may be supplied either to the silo 3 or back to the drum 1 again. For this purpose the belt conveyor 22 has one end adjacent to the silo 3 and, respectively, one to the lifting conveying device leading to the drum 1. The lifting conveying device in the illustrated working example is in the form of elevator wheels 26 arranged at the ends of the drum and having an axis which is offset in parallelism in relation to the drum axis. The wheels 26 bridge over the difference in height between the belt conveyor 22, which extends under the drum 1, and the inlet opening of the silo 3 or, respectively, of the drum 1. The elevator wheels 26 mounted on the sides of the portal frame 21, which are opposite to the stationary drum end walls 7, of the futher frame 16. For this purpose on their inner end face, that is to say the end face on the drum side, the elevator wheels 26 are each provided with an encircling runner ring 27, into which the wheels on the frame fit. One of the wheels is driven by an associated motor. The drive motors of the elevator wheels 26 are able to be operated together with the drive motor 25 of the belt conveyor 22 cooperating with the one of the other elevator wheel 26 so that there is an efficient removal of the material thrown from the belt conveyor 22.

The belt conveyor 22 throws the material collecting on it via bridges or the like outwards into the one or the other elevator wheel 26. Starting material comminuted by the comminuting device 2 is also thrown into the elevator wheel 26 associated with the drum 1 and shown in the right in FIG. 1, from the outside. For this purpose the comminuting device 2 is provided with a discharge duct 30 fitting into the elevator wheel 26 and opening into the lower apical part. The drive for the elevator wheel 26 on the drum side is switched on at the same time as the drive for the comminuting device 2. The elevator wheels 26 tip the contents of their vanes in the upper apical part into the receiving hopper 31 and, respectively, 32 fitting into them and placed on the drum side and on the silo side. The receiving hopper 32 on the silo side may be simply in the form of a snout projecting from the silo wall into the associated elevator wheel 26. The receiving hopper 31 on the drum side is a part of the charging device for the drum 1.

In the illustrated form of the invention the charging device comprises a conveying screw 33 which is mounted on the receiving hopper 31 and is introduced through the adjacent drum end wall in the upper apical part of the drum into the space within the drum. The screw 33 is driven by means of a drive motor 34 carried by means of a housing on the stationary drum end wall 7. The drive motor 34 is so coupled with the drive of the elevator wheel 36 on the drum side that the motors are jointly put into operation. The discharge lip of the screw 33 is located adjacent to the inner side to the end wall 7, through which the material is supplied to the drum 1.

In order to be able to comminute the lumps or coarser chunks of material to be systematically taken from the drum 1 via the doorways 60, there is a comminuting device on the return path of the material into the drum 1, which has been taken from the drum 1. In the design in accordance with FIG. 1 there is a comminuting device 65 which cooperates with the belt conveyor 22 forming the longitudinal conveying device. The comminuting device 65 includes a set of three tandem arranged disk rolls 67 interlocking with each other at their periphery and arranged in a duct 66 which is peripherally closed. As will best be seen from FIG. 4, the rolls 67 possess generally stellate laterally spaced knife disks 68. The knife disks of mutually adjacent disk rolls 67 are laterally offset in relation to each other, that is to say the knife disk of one roll is opposite the space between two disks of the other roll, and this avoids contact between the disks. The three disk rolls 67 may be so driven that the material to be comminuted is caused to move along a loop-like path running around the middle roll. In this case all the three disk rolls 67 are driven at the same rate counterclockwise so that their downwardly directed peripheral sections have a conveying component in the direction of rotation, as is indicated by the arrows in FIG. 4.

In order in this arrangement to ensure an efficient comminution of the material, at least one disk roll 67, in the present case the middle and rear ones, is provided with a stationary abutment rail 67a, mounted near the floor of the duct so as to extend transversely in relation to the direction of conveying. This rail is made up of laterally spaced out lugs, which are mounted alternatingly with respect to the knife disks 68 of the associated roll. The lugs extend into the envelope curve of the associated disk rolls. The rails 67a accordingly form a grating, whose slots have the knives of an associated knife disk 68 running into them. In the working embodiment of the invention shown in FIG. 4, the rail 67a cooperating with the middle disk roll has inclined, roof-like flanks in order to avoid colliding contact with the adjacent disk rolls. The rail associated with the rear disk roll has one inclined flank.

The duct 66 fits over the associated end of the belt conveyor 22 and accordingly its bottom is cut back where there is overlap. The duct bottom 69 adjoining the belt conveyor 22 and in the present case carrying the rails 67a, practically forms a chute leading to the adjacent conveying device 26. The discharge lip of the chute fits over, like the discharge lip of the discharge duct 30 of the input comminuting device 2, the elevator wheel 26 (provided here for forming the lifting conveying device adjacent to the end of the drum on the charging side) in the lower apical part. The inclination of the duct 66 is adjustable as is indicated by the spin and slot connection 70 shown in FIG. 4. The floor clearance of the disk rolls 67 is also able to be adjusted, as is indicated in FIG. 4 by double arrows.

In addition to the comminuting device 65, or as an alternative thereto, in the present case adjacent to the charging device formed by the screw 33 it is possible to have a comminuting device 71. In the case of such a design as shown in FIG. 5, the screw 33 forming the charging device, that is to say loading the drum 1, is provided on its periphery with a number of axially continuous knives 72 which are preferably slightly twisted and which run past a stationary counter-knife 73. The latter may be mounted on the screw housing fitting around the screw 33. The knife screw provided in the present case on the one hand causes an axial motion of the material and on the other hand causes simultaneous comminution of the material coming into engagement with it, that is to say the material thrown by the elevator wheel 26 into the receiving hopper 31 of the charging device.

In the case of the design shown in FIGS. 6 and 7 the comminution of the lumps and the like able to be abstracted from the drum 1 is simply performed by the input comminuting device 2. The lifting conveying device 26a provided adjacent to the end of the drum on the charging side, and the charging device 33a adjoining the same are for this purpose so designed that the material thrown by the longitudinal conveying device 22 fitting under the drum 1 into the lifting conveying device 26a may either be directly supplied to the drum 1, as is indicated by the unbroken arrow line in FIG. 6, or, as is indicated by a broken arrow line, may be diverted via the input comminuting device 2 and then supplied like new starting material to the drum 1.

For this purpose the lifting conveying device 26a has two lifting conveyors placed in tandem in the axial direction. In the illustrated working example the elevator wheel forming this double lifting conveyor device 26a is for this purpose provided with two adjacently placed encircling rings 74 and, respectively, 75 of tandem arranged chambers 76, the ring 74 on the drum side, the ring 74 on the drum side being able to be charged by the belt conveyor 22 while the outer ring 75 remote from the drum 1 is able to be charged by the input comminuting device 2 or, respectively, a conveying member associated therewith in the form of the discharge duct 30 or, respectively, a conveying belt 30a provided in lieu thereof. This will best be seen from FIG. 6. The material dropping in the upper apical part of the double elevator wheel 26a out of the chambers 76 thereof is taken up by the charging device 33a, which includes two charging members. In the illustrated working example of the invention these members each comprise, as may be best seen from FIG. 7, receiving hopper 77 or, respectively, 78 fitting under as associated ring 74 and, respectively, 75 of the double elevator wheel 26a. A respective adjacent conveying screw 79 and, respectively, 80 extends from each receiving hopper adjacent to the bottom. The receiving hoppers 77 and, respectively, 78 are accordingly offset in relation to each other in the axial direction of the drum and arranged so as to be bilaterally symmetrical to each other so that their opening cross sections are in the same peripheral part of the double elevator wheel 26 and the conveying screws 29 and 90 adjacent to each other at the receiving hopper are offset to each other in parallelism, as will be readily seen by FIG. 7.

The two conveying screws 79 and, respectively, 80 lead via the adjacent drum end wall into the drum 1. The conveying screw 79 adjacent to the receiving hopper 77 associated with the inner ring 74 on the drum side has a further discharge point 81 opposite to the discharge lip on the drum side. This discharge point is placed in this case over the input comminuting device 2. For this purpose the conveying screw 79 is arranged so as to extend out of the double elevator wheel 26a both on the drum side and also opposite to the drum 1. Dependent on the direction of rotation of the conveying screw 79 the material drawn in by it will be supplied either to the drum 1 or to the input comminuting device 2. The conveying screw 80 arranged to be loaded by the ring 75 remote from the drum 1 possesses only one point of discharge on the drum side and is at all times so driven that the drum 1 is loaded by it.

The above described arrangement thus means that new material, which has passed through the input comminuting device 2, is fed directly to the drum 1. For this purpose the conveying screw 80 is in operation. It is also possible for material sifted out of the drum 1 to be directly fed into the drum again. For this purpose the conveying screw is in operation in a direction of rotation, which effects a supply of the material to the drum 1. By reversing the conveying screw 79 it is possible to cause it to feed into the input comminuting device 2 so that in the case of rotation of the drum 1 as indicated in FIG. 3 lumps falling from the drum may be reduced in size. The drive of the conveying screw 79 is accordingly so controlled that in the case of rotation of the drum 1 as in FIG. 2 there is a direction of rotation feeding to the drum 1 as in FIG. 3 there is a direction of rotation feeding towards the input comminuting device. The material passing through the input comminuting device 2 is in this case then later supplied by the outer ring 75 to the further charging member in the form of the receiving hopper 78 with its associated conveying screw 80, which supplies to the drum. The conveying screw is accordingly always in operation with the input comminuting device 2 which is in operation both for the comminution of new material and also automatically in the case of rotation of the drum as indicated in FIG. 3.

The housing 40 of the input comminuting device 2 is mounted in a stationary manner on an extension 16a, which runs through the associated elevator wheel 26, of the frame 16. The housing 40 is open in an upward direction. In order to cause the grinding or milling unit of the comminuting device, to be supplied in portions there is in this case a trough-like feed container 41, which is able to be pivoted between a filling setting extending past the housing 40 and an emptying setting over the housing 40 as indicated in broken lines. In the emptying setting the content of the container is tipped into the grinding unit. The capacity of the input container 41 is substantially smaller than the capacity of the drum 1 so that a fairly large number of fillings of the input container 41 may be placed in the drum 1 before its capacity is exhausted. A filling or a particular number of fillings of the input container 41 may in this respect be used as a billing unit in order to compute processing costs.

In order to ensure operation without supervision being required, there is an automatic feed device 43 for makinng payment by coins, banknotes, tokens, etc. as payment means which after the reception of a money in a suitable form puts the comminuting device 2 into operation batchwise, that is to say the input container is freed or enabled for the reception of the number of fillings of the input container 41.

The pivoting motion of the input container 41 may be produced by hand or by means of a lifting unit which is not shown in detail here and which is put into operation manually or by an automatic mechanism. In the case of a motor-driven pivoting drive for the input container the latter may be operated by a starting device indicated in the form of a start knob 43d of the automatic device 43 for receiving money, tokens or the like. The automatic payment device 43 is provided with an input device and a return device with an indicating module 43c to indicate the number of charges which have been payed for but so far not processed. It may also indicate why the system is unable to accept any charges. In order to ensure reliable emergency stopping of the comminuting device 2 there is an emergency switch 45 in the form of a handle bar by means of which the drive of the comminuting device 2 and preferably all drives may be switched off.

The finished compost is removed from the silo 3. The latter is provided with an output device 51. The output device may be in the form of a simple outlet pipe with a device for shutting it off. The output device 51 is provided with a portioning out device 53 in order to ensure the possibility of operation without supervision, i.e. self-service. This device 53 is operated by payment means at the associated payment means automatic device 54. The design of the automatic payment processing device 54 is practically the same as the design of the automatic input payment accepting device 43 with the difference however that the indicating module shows the number of paid for charges which have not been removed or the reason for the inability of the system to process.

The filling of the silo 3 is sensed by at least two sensors, responding to the two extreme values of filling, or more sensors of the type indicated at 56. In the event of there being more than two sensors the same may be so placed in circuit that the sensor or sensors between the two extreme positions give rise to a fill-up signal to the drum 1 and the conveying means leading to the silo. This thus causes refilling or topping up to be continued as long as there is a supply in the silo 3 so that the output of compost does not have to be interrupted. The sensors for the extreme level values prevent further output of material or further filling up of the silo.

In place of the silo 3 which in the present case forms the compost store, it would also be possible for the compost to be stocked in the form of heaps for further ripening or decay. In this case it would be possible to have a heap forming device in the form of a longitudinal conveyor supplied by the belt conveyor 22 directly or indirectly via the elevator wheel 26 and a charging device cooperating with the latter. The longitudinal conveyor would then be swept over the heap area generally in the form of half a circle.

We claim:

1. A composting apparatus comprising a drum supported for rotation about a substantially level longitudinal axis thereof, means for driving said drum about said axis, said drum including a peripheral casing which is at least partly in the form of perforated sheet metal panels, a longitudinal conveying device fitted under said drum and able to be driven selectively in opposite directions for selective conveying of compost falling from said drum to a compost deposit and a lifting conveying device arranged at an entry end of said drum, a charging device arranged in an upper part of the drum for cooperation with the lifting conveyor, the said drum driving means being adapted to turn said drum in either direction about said axis, and at least one internal hinged door in said casing for closing and opening a door opening in said casing, said door being arranged to pivot about a hinge axis parallel to the drum axis.

2. The composter as claimed in claim 1 wherein each door of each associated door opening is made of perforated sheet metal.

3. The composter as claimed in claim 3 comprising a plurality of doors which are preferably offset in relation to each other in the peripheral direction.

4. The composter as claimed in claim 3 wherein the door openings are provided in a single length section of the drum.

5. The composter as claimed in claim 4 wherein said section is provided adjacent to one end of the drum and preferably adjacent to the drum end which is to the front in relation to the direction of charging by the charging device which is preferably placed adjacent one end of the drum.

6. The composter as claimed in claim 1 wherein a section of the length of the dum having at least one such door opening therein corresponds to the collecting part for coarse material.

7. The composter as claimed in claim 1 comprising at least one comminuting device able to be loaded by the longitudinal conveying device placed under the drum directly or indirectly with material falling out of the drum.

8. The composter as claimed in claim 7 comprising at least one comminuting device arranged in a duct able to be supplied by the longitudinal conveying device, said duct having a discharge lip arranged over the lifting conveying device and preferably able to be adjusted.

9. The composter as claimed in claim 8, wherein the comminuting device has at least one disk roll and a plurality of such disk rolls with their disks overlapping, such disks being in the form of stellate laterally overlapping knife disks.

10. The composter as claimed in claim 9 wherein one such vertically adjustable disk roll is arranged to be in engagement with at least one stationary opposite bar preferably in the form of a grating with through slots for the knives of the disk roll.

11. The composter as claimed in claim 7, wherein said charging device arranged to be fed by said lifting conveying device is provided with at least one comminuting device.

12. The composter as claimed in claim 11 wherein the charging device which ends adjacent to the drum end adjacent to the lifting conveying device comprises a conveying screw, which along at least a part of its length is provided with peripherally arranged knives connecting a plurality of screw turns with each other, such knives being arranged to run past at least one stationary opposite knife of the screw housing.

13. The composter as claimed in claim 7 comprising an input comminuting device for the comminution of the starting material and which is arranged diametrically opposite to the conveying device, loaded by it, said lifting conveying device having two parallel lifting conveyors which are able to be loaded by the longitudinal conveying device and, respectively, by the input comminuting device, and the charging device has two charging members arranged to be loaded by a respective one of the lifting conveyors, one of the charging members which is to be charged by the lifting conveyor associatd with the longitudinal conveying device including means for driving it selectively backwards and forwards and which, alternately, loads the drum and loads the input comminuting device.

14. The composter as claimed in claim 13, wherein the lifting conveying device is in the form of a double elevator wheel with adjacently placed rings of chambers associated with the longitudinal conveying device and, respectively, the input comminuting device, said rings of chamber being placed one after the other in the peripheral direction and in an upper apical part have juxtaposed supply hoppers placed under them, parallel conveying screws extending from the hoppers.

15. The composter as claimed in claim 1 wherein the diameter of the perforation holes in the perforated panels forming the drum casing is greatest in the longitudinal section having at least one door opening and such hole diameter decreases with an increase in the distance therefrom.

16. The composter as claimed in claim 1 wherein the drum, which contains a supporting structure with openings therein closed by such perforated panels and formed by longitudinal and transverse beams, has a polygonal and more particularly octagonal cross section at least in the part thereof containing at least one door opening, has flat peripheral panel portions each with at least one door opening, the extent of the same in the peripheral direction being less than half the cross section edge length and whose associated door is hinged generally adjacent to the middle of the cross section edges.

17. The composter as claimed in claim 18 wherein said silo is provided with an output device which has a portioning-out means which is able to be put into operation charge by charge by means of an automatic device, responding to the insertion into it of payment means and having a start button.

18. The composter as claimed in claim 1 comprising a respective lifting conveyinng device, adapted to be fed by the longitudinal conveying device, adjacent to the ends of the drum, a compost deposit in the form of a silo being arranged to be fed by the lifting conveying device remote from the charging device.

19. The composter as claimed in claim 1 wherein the longitudinal conveying device is arranged at the bottom of a duct fitted under the drum in the form of a letter V.

20. The composter as claimed in claim 1 wherein said drum has two stationary end walls, between which the moving drum casing is mounted, which is provided with peripheral encircling runner rings, such rings running on oppositely placed rollers of which at least one may be driven in either direction of rotation.

21. The composter as claimed in claim 1 comprising an input comminuting device provided with a container to be selectively filled and emptied by means of a motor, said container having a capacity which is substantially smaller than the capacity of the drum.

22. The composter as claimed in claim 21 wherein the input comminuting device and its input container are able to be put into operation charge by charge by an automatic device responding to the insertion thereinto of payment means and having a start button.

* * * * *